(12) United States Patent
Glenn, III (10) Patent No.: US 10,188,123 B2
(45) Date of Patent: Jan. 29, 2019

(54) METHODS OF MAKING REDUCED SODIUM FOOD PRODUCTS FORMED OF POTASSIUM-CONTAINING EMULSIFYING SALT MIXTURES

(71) Applicant: Land O'Lakes, Inc., Arden Hills, MN (US)

(72) Inventor: Thomas Alexander Glenn, III, Shoreview, MN (US)

(73) Assignee: LAND O'LAKES, INC., Arden Hills, MN (US)

( * ) Notice: Subject to any disclaimer, the term of this patent is extended or adjusted under 35 U.S.C. 154(b) by 0 days.

(21) Appl. No.: 15/450,525

(22) Filed: Mar. 6, 2017

(65) Prior Publication Data

US 2017/0172168 A1    Jun. 22, 2017

Related U.S. Application Data

(63) Continuation of application No. 13/599,751, filed on Aug. 30, 2012, now Pat. No. 9,622,496.

(51) Int. Cl.
*A23C 19/082* (2006.01)
*A23C 19/00* (2006.01)

(52) U.S. Cl.
CPC ........ *A23C 19/082* (2013.01); *A23C 2250/05* (2013.01)

(58) Field of Classification Search
CPC .......................... A23C 19/082; A23C 2250/05
USPC ........................................ 426/580, 582, 649
See application file for complete search history.

(56) References Cited

U.S. PATENT DOCUMENTS 5,466,477 A     11/1995  Sevenich
2009/0061065 A1  3/2009  Reyes

FOREIGN PATENT DOCUMENTS

WO     WO 2012/023863 A1     2/2012

*Primary Examiner* — Leslie A Wong
(74) *Attorney, Agent, or Firm* — Dorsey & Whitney LLP (57) ABSTRACT

A method of preparing a less sodium food product involves forming a reaction mixture of one or more of liquid sodium potassium hydrogen phosphate and liquid sodium dipotassium phosphate and combining a food ingredient with the emulsifying salt mixture. A reduced sodium process cheese product is formed of a sol to gel conversion fat stabilized via a hydrated protein matrix by a combination of potassium caseinate and sodium caseinate in which the caseinates are derived from an emulsifying salt mixture of liquid sodium potassium hydrogen phosphate and liquid sodium dipotassium phosphate, which, prior to reaction, accounts for at least about 2.5 and up to about 8.32 percent by weight of a total weight of the process cheese product. The emulsifying salt mixture formed of the reaction mixture remains in solution at ambient conditions for at least two weeks prior to incorporation with a food ingredient.

15 Claims, 2 Drawing Sheets

METHODS OF MAKING REDUCED SODIUM FOOD PRODUCTS FORMED OF POTASSIUM-CONTAINING EMULSIFYING SALT MIXTURES

CROSS-REFERENCE TO RELATED APPLICATION(S)

This application is a continuation of U.S. Ser. No. 13/599,751 filed Aug. 30, 2012, the contents of which are hereby incorporated by reference.

FIELD OF TECHNOLOGY

Implementations are directed to food products, and more particularly are directed to less sodium food products and methods of making and using such products through the use of potassium-containing liquid emulsifying agents.

BACKGROUND

Process cheeses are blends of natural cheese, emulsifying salts and other ingredients. The blends are generally processed into a molten sol by heating and blending. During processing, the molten sol may destabilize causing the fat to separate. Emulsifying salts such as sodium phosphate help prevent fat separation and control the pH of cheese.

Fat separation is prevented, or the fat is re-incorporated in the homogenous mixture during the heating and cooking process using the emulsifying salts. The emulsifying salts participate in an ion exchange reaction with caseins, the main protein source in natural cheese. The ion exchange process involves the removal of calcium from the insoluble collodial calcium phosphate complexes that stabilize casein-casein interactions in the gel matrix of the cheese. In effect, the divalent cation calcium is replaced by the monovalent cation sodium within the casein matrix through this process, solubilizing the colloidal calcium phosphate complex, converting calcium caseinate to sodium caseinate. Once the calcium is separated from the casein, the more hydrophobic regions of the casein can more effectively interact with the milk fat and the more hydrophilic regions of the casein can more effectively interact with the water transitioning from a gel state to a sol state. Thus, when the casein is separated from calcium, it acts as an emulsifier to stabilize the sol, thus allowing the components to combine. Upon cooling the transition from the sol state to a gel state is complete wherein the hydrated protein matrix stabilizes the fat in the product.

Emulsifying salts also control the pH of the cheese, which facilitates the organoleptic properties of the cheese by keeping the cheese from being too acidic or basic.

These salts also contribute to providing a smooth, creamy texture of the finished product and enable slices and spreads with varying firmness and melting properties to be produced. For example, process cheese may be poured into molds or shaped into slices and may resist melting, while some process cheese spreads melt readily to provide a pourable product.

Although emulsifying salts are required for the production of process cheese, their addition results in process cheese products having a relatively high sodium concentration compared to their natural cheese counterparts.

SUMMARY

Emulsifying salt mixtures with potassium-containing liquid emulsifying agents, and systems and methods of making reduced sodium food products using the emulsifying agents are provided herein.

According to some implementations, a method of preparing a less sodium food product involves forming a reaction mixture of one or more of liquid sodium potassium hydrogen phosphate and liquid sodium dipotassium phosphate, and combining a food ingredient with the emulsifying salt mixture to form the less sodium food product. In some implementations, the food product may be process cheese.

In other implementations, a reduced sodium process cheese product, upon cooling, includes a sol to gel conversion fat stabilized via a hydrated protein matrix by a combination of potassium caseinate and sodium caseinate. The potassium and sodium caseinate are derived from an emulsifying salt mixture of one or more of liquid sodium potassium hydrogen phosphate and liquid sodium dipotassium phosphate, and the emulsifying salt mixture, prior to forming the product, accounting for at least about 2.5 and up to about 8.32 percent by weight of a total weight of the process cheese product.

In further implementations, an emulsifying salt mixture includes a reaction mixture of one or more of liquid sodium dihydrogen phosphate in reaction with liquid potassium hydroxide and liquid potassium dihydrogen phosphate in reaction with liquid sodium hydroxide to form one or more of liquid sodium potassium hydrogen phosphate and liquid sodium dipotassium phosphate. The emulsifying salt mixture remains in solution at ambient conditions for at least two weeks prior to incorporation in a food ingredient.

In further implementations, an emulsifying salt mixture includes a reaction mixture of one or more of liquid sodium dihydrogen phosphate in reaction with liquid potassium hydroxide and liquid potassium dihydrogen phosphate in reaction with liquid sodium hydroxide to form one or more of liquid sodium potassium hydrogen phosphate and liquid sodium dipotassium phosphate. This emulsifying salt mixture may also include residual unreacted liquid sodium dihydrogen phosphate or unreacted liquid potassium dihydrogen phosphate.

DETAILED DESCRIPTION

Implementations of the present disclosure are directed to emulsifying salt mixtures with potassium-containing liquid emulsifying agents, and systems and methods of making reduced sodium food products, including reduced sodium process cheese products, using the emulsifying agents.

In prior approaches, sodium phosphate emulsifying salts have been used as a major source of sodium in food products such as dairy-based products including process cheese. The sodium present in these emulsifying salts contributes to the total sodium of the food product, thereby making it difficult to produce food products with a low or reduced sodium content. One approach has been to reduce the level of sodium phosphate by replacing a portion of disodium hydrogen phosphate (e.g., $Na_2HPO_4$) with dipotassium hydrogen phosphate (e.g., $K_2HPO_4$). Although a partial replacement of disodium hydrogen phosphate ($Na_2HPO_4$) with dipotassium hydrogen phosphate ($K_2HPO_4$) can achieve similar product attributes in, for example, reduced sodium cheeses, such processes require the management of incorporating two separate phosphate emulsifying salts.

Less Sodium Potassium-Containing Emulsifying Salt Mixtures

Implementations herein provide advantages over prior approaches that use sodium phosphate-based emulsifying salts (e.g., sodium dihydrogen, disodium hydrogen and trisodium phosphate emulsifying salts) and over the use of separate additions of sodium and potassium phosphates by providing a liquid sodium potassium phosphate-based emulsifying salt mixture (e.g., $NaKHPO_4$) for use in the production of food products including dairy-based products such as process cheese. It has been discovered that food products produced using sodium potassium hydrogen phosphate have improved organoleptic properties compared to food products produced using emulsifying salt mixtures of a reaction of sodium dihydrogen phosphate and sodium hydroxide along with dry or liquid forms of dipotassium hydrogen phosphate. Further, it has been discovered that process cheese products provided according to implementations herein exhibit substantially no crystallization on the surface of sliced cheese products after several days compared to process cheese produced using the above-described sodium phosphate-based emulsifying salts.

According to certain implementations, a liquid emulsifying salt mixture may be provided by reacting liquid sodium dihydrogen phosphate ($NaH_2PO_4$(liq)) with liquid potassium hydroxide (KOH(liq)) to form the liquid sodium potassium hydrogen phosphate ($NaKHPO_4$(liq)) emulsifying salt mixture. In addition or alternatively, the liquid sodium potassium hydrogen phosphate ($NaKHPO_4$(liq)) emulsifying salt mixture may be formed by reacting liquid potassium hydrogen phosphate ($KH_2PO_4$(liq)) with liquid sodium hydroxide (NaOH(liq)).

The liquid sodium dihydrogen phosphate or the liquid potassium hydrogen phosphate in the reaction mixture may be formed of between about 20 and about 55 percent, or preferably about 45 percent in solution, and, prior to reaction, may account for between about 2 to about 6.67 percent by weight, and preferably about 3.5 percent by weight, of the total weight of the composition of the food product. Liquid potassium hydroxide or the liquid sodium hydroxide may be formed of about 10 to about 55 percent, or preferably about 50 percent in solution, and, prior to reaction, may account for between about 0.50 and about 4 percent, and preferably about 1.2 percent, by weight of the total weight of the composition of the food product.

In the emulsifying salt mixture, as the amount of potassium hydroxide increases, hydrogen may be displaced in the sodium potassium hydrogen phosphate with potassium to form sodium dipotassium phosphate ($NaK_2PO_4$(liq)). In particular, the potassium cations in the reaction mixture readily interact with the weak sodium phosphate acid (e.g., sodium dihydrogen phosphate $NaH_2PO_4$) forming a sodium potassium phosphate complex. This is accomplished via a dynamic equilibrium process wherein the reaction begins between the hydroxide component of the potassium hydroxide base as it solubilizes into solution and free hydrogen in the environment forming water in the reaction. This consequently shifts the ratio of free hydrogen and free hydroxide in the system and in an attempt to maintain the noted equilibrium quantities of free hydrogen and free hydroxide, hydrogen shifts off of the sodium dihydrogen phosphate and into solution, thus promoting the sodium potassium phosphate complex to form. With increased potassium hydroxide, more hydrogen is ultimately displaced in an effort to maintain the noted equilibrium in the environment. Similarly, as the amount of sodium hydroxide increases, hydrogen may be displaced in the sodium potassium hydrogen phosphate with sodium to form disodium potassium phosphate ($Na_2KPO_4$(liq)). Accordingly, with increased sodium hydroxide, more hydrogen may be displaced.

Therefore, in some implementations, an emulsifying salt mixture includes a reaction mixture of one or both of liquid sodium dihydrogen phosphate ($NaH_2PO_4$) in reaction with liquid potassium hydroxide, and liquid potassium dihydrogen phosphate ($KH_2PO_4$) in reaction with liquid sodium hydroxide, to form one or more of liquid sodium potassium hydrogen phosphate and liquid sodium dipotassium phosphate. This emulsifying salt mixture may also include residual unreacted liquid sodium dihydrogen phosphate or unreacted liquid potassium dihydrogen phosphate. For example, the unreacted sodium dihydrogen phosphate or potassium dihydrogen phosphate may account for up to about 50 percent of the salt in the emulsifying salt mixture, whereas the sodium potassium hydrogen phosphate ($NaKHPO_4$) and/or sodium dipotassium phosphate ($NaK_2PO_4$) accounts for at least 50 percent of the salt and up to 100 percent of the emulsifying salt mixture. The emulsifying salt mixture may have a pH of between about 6 and 9, or about 8. However, the pH may vary depending on the desired flavor, texture and melting attributes of the food product in which the emulsifying salt mixture is used.

Where the emulsifying salt mixture is formed of a mixture of sodium potassium hydrogen phosphate ($NaKHPO_4$) and sodium dipotassium phosphate ($NaK_2PO_4$), the sodium dipotassium phosphate ($NaK_2PO_4$) may account for up to about 80 percent of the salt in the emulsifying salt mixture, whereas the sodium potassium hydrogen phosphate ($NaKHPO_4$) may account for at least 20 percent of the salt and up to 100 percent of the emulsifying salt mixture. The emulsifying salt mixture may have a pH of between about 9 and 12, or about 9. However, the pH may vary depending on the desired flavor, texture and melting attributes of the food product in which the emulsifying salt mixture is used.

In further implementations, the emulsifying salt mixture may be formed of a reaction mixture of liquid potassium dihydrogen phosphate ($KH_2PO_4$(liq)) with potassium hydroxide (KOH(liq)) to form dipotassium hydrogen phosphate ($K_2HPO_4$(liq)). In yet further implementations, the aforementioned reaction mixture may additionally include a portion of liquid monosodium phosphate so that the emulsifying salt mixture includes a combination of the dipotassium hydrogen phosphate and sodium potassium phosphate.

Generally, a composition of the food product includes the emulsifying salt mixture, prior to reaction, of between about 2.5 and about 8.32 percent by weight, or preferably about 4.7 percent by weight, of the total weight of the composition of the food product.

In some implementations, a small amount of liquid sodium hydroxide (NaOH) may be included in the reaction mixture with the KOH(liq) and the $NaKHPO_4$(liq), such as about 0.1 percent NaOH of the total weight of the food composition prior to reaction. In this example, a small fraction of the emulsifying salt mixture may be composed of disodium hydrogen phosphate ($Na_2HPO_4$(liq)), with the predominant form being sodium potassium hydrogen phosphate ($NaKPO_4$(liq)). However, it will be appreciated that the amount of potassium hydroxide is present in the emulsifying salt reaction mixture by at least a factor of 5 (e.g., at least 0.5 percent of the total weight of the composition) and in this example, the sodium potassium hydrogen phosphate (NaKHPO$_4$) will continue to account for at least 95 percent of the salt and up to 100 percent of the emulsifying salt mixture as provided above. Alternatively, the reaction mixture may be substantially free of sodium hydroxide (e.g., less than 0.05 percent of the weight of the batch).

In some implementations, the emulsifying salt mixture exhibits a reduced level of crystallization compared to a sodium phosphate-based emulsifying salt mixture that is substantially free of potassium. For example, a reacted mixture yielding disodium hydrogen phosphate may exhibit crystallization within about two days when in solution at ambient temperatures, which is in comparison to the potassium-containing emulsifying salt mixtures of the present disclosure that exhibit substantially no crystallization when held at ambient temperatures. For example, even after about two weeks, potassium-containing emulsifying salt mixtures held at ambient temperatures exhibit substantially no crystallization. By remaining in solution at ambient temperatures, the emulsifying salt mixture may be stored for prolonged periods of time prior to use, which may be beneficial for storage, shipping and handling of the emulsifying salt mixture, in contrast to reacted mixtures yielding disodium hydrogen phosphate, requiring handling and storage temperatures ranging from 140-200° F. to prevent crystallization of the mixture prior to use. For example, after storing at ambient conditions for about two weeks, the emulsifying salt mixture in solution may be used immediately in a food processing plant as a food product ingredient without additional processing steps.

Providing liquid emulsifying salt mixtures of sodium potassium phosphate, according to the present disclosure, surprisingly resulted in food products having improved organoleptic properties. Historically, food products such as process cheese were taught to have a metallic flavor when prepared with potassium-containing emulsifying salts. In U.S. Pat. No. 5,466,477, the reference teaches potassium salts when used in connection with providing an emulsifying salt, tend to give the negative organoleptic property of a metallic taste to the dairy product and consequently teaches the use of sodium hydroxide in forming an emulsifying salt.

In contrast, and as provided herein, it has been discovered that by combining the liquid potassium hydroxide with the sodium dihydrogen phosphate, the resulting liquid sodium potassium phosphate emulsifying salt mixtures provide a less sodium food product having desirable properties (e.g., improved flavor). It is believed that the combination of sodium and potassium in the sodium potassium phosphate salts results in a more homogeneously dispersed environment of sodium and potassium providing a salty flavor to taste receptors from sodium, which shields taste receptors from an excess amount of potassium in the food product that may otherwise impart a metallic flavor. Further, it is believed that with the liquid state of the reacted components, potassium is more readily able to displace calcium within the casein protein, thus interacting with the protein more so than with using a dry potassium source, reducing the level of free potassium in the environment that would be more readily available to impart a metallic flavor. Moreover, the combination of the potassium and sodium in the liquid solution allows the levels of potassium and sodium to be controlled in the liquid emulsifying salt mixture, which is in contrast to dry forms of potassium and sodium containing emulsifying salts.

Food Products Including the Emulsifying Salt Mixture

A variety of food products may be prepared using the liquid emulsifying salt mixtures disclosed herein. For example, process cheese; cheese dips and sauces; cheese powders; imitation cheese; canned milk; UHT milk; instant pudding; ice cream; frozen desserts; cooked cereals; extruded dry cereals; and pasta products among others.

One type of food product that preferably includes the liquid emulsifying salt mixture is process cheese. Examples of process cheese products include, but are not limited to, process cheese loafs, slices, spreads, sauces, sticks, snacks, and powders. Cheeses that may be used in the process cheese include, but are not limited to, Cheddar (e.g., new, old, semi-mature), Mozzarella, Colby, Swiss, washed curd, enzyme modified and granular cheese. Other dairy ingredients that may be used in the process cheese include, but are not limited to, anhydrous milkfat, cream, dehydrated cream, nonfat dry milk, casein, whey, whey protein concentrate and milk protein concentrate.

Nondairy ingredients may include, but are not limited to, water, vinegar, lactic acid, citric acid, acetic acid, and phosphoric acid, salt, colorants, spices, preservatives, flavorants.

It has been discovered that process cheese products prepared using the above-described liquid emulsifying salt mixtures, when sliced and placed on display (e.g., in a deli or in a package) exhibit lower salt crystallization on the cheese surface compared to sliced process cheese products prepared using an emulsifying salt mixture derived from liquid sodium dihydrogen phosphate reacted with sodium hydroxide to yield liquid disodium hydrogen phosphate. This is because of disodium phosphate's low solubility in the water phase of the process cheese. When the process cheese is sliced and packaged, the headspace of the package can saturate with moisture vapor and microscopically condense on cheese surfaces, especially if temperature abused. This promotes a concentration gradient of dissolved solutes between the bulk water phase of the process cheese and condensed surface moisture that creates a driving force for phosphate and other soluble salts to enter this substantially solute free surface moisture environment. With limited diffusional resistance within the surface moisture the disodium hydrogen phosphate can nucleate and crystallize on the surface depending on pH and other factors, particularly if the product within the package is temperature abused (i.e., removed from a refrigerated environment and placed in ambient temperature for an extended period of time) and the headspace becomes saturated again with moisture from the condensed surfaces further concentrating the noted solutes on the slice surfaces promoting the crystallization phenomenon. In contrast, the sodium potassium hydrogen phosphate emulsifying salt mixture is a more inherently stable salt mixture of higher water solubility that yields a relatively lower amount of crystallization or no crystallization results on the surface of the sliced cheese. This may improve handling characteristics and quality of the process cheese products.

Method of Forming Process Cheese Using the Emulsifying Salt Mixture

Figure 1:
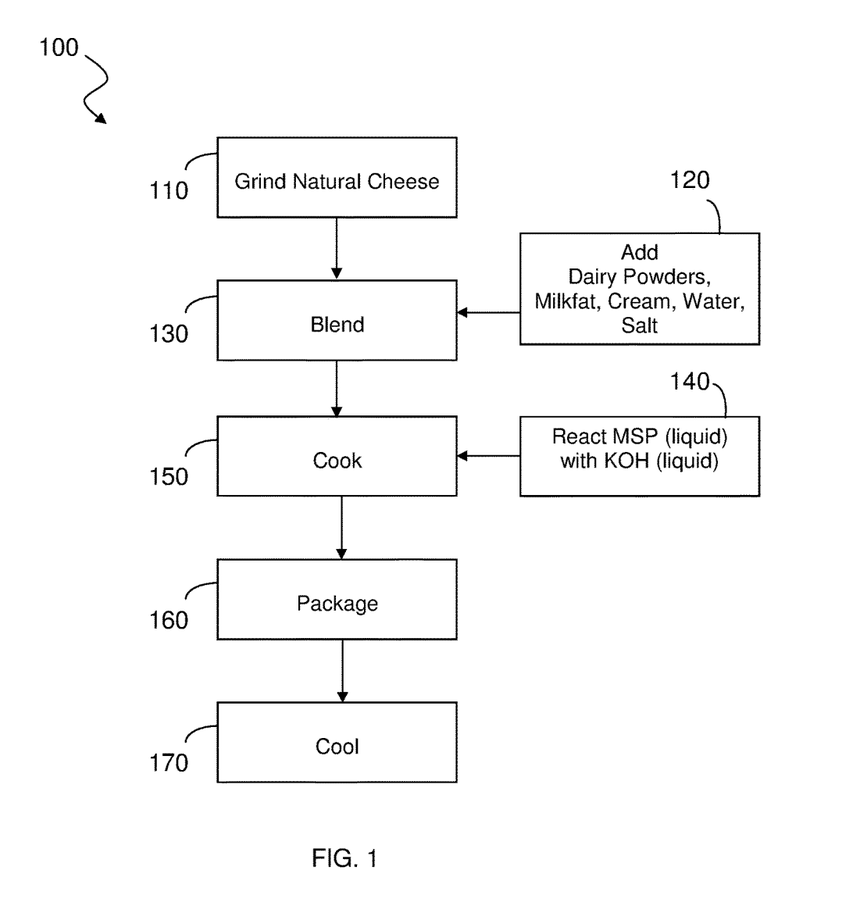
FIG. 1 illustrates a method of producing a process cheese product having a reduced sodium content according to certain implementations.

According to certain implementations, a method of producing a process cheese product having a reduced sodium content may be produced according to the method 100 of FIG. 1. Although FIG. 1 illustrates a method for producing process cheese, it will be understood that other dairy-based products may be prepared in the same or in a similar manner of method 100. In addition, the dairy-based products that include the liquid emulsifying salt mixture may be formed in a continuous or batch process.

The method 100 includes grinding 110 natural cheese or a blend of natural cheeses to form cheese particulates. The ground cheese mixture may be transferred to a blender (e.g., a twin ribbon blender), and other dairy ingredients such as anhydrous milkfat, dairy powders, water, milkfat, cream, and optionally other non-diary ingredients such as colorants and flavorants may also be added 120 to the blender. In some instances, the non-cheese ingredients may be melted prior to adding 120 to the blender. For example, anhydrous milkfat may be heated to about 120° F. so that the melted anhydrous milkfat is combined with the cheese and other ingredients.

The mixture may be blended 130 to form a homogenous mixture. For example, the mixture may be blended for about 5 minutes, but blending times may vary based on factors such as the weight of the mixture and speed and holding capacity of the blender. In some implementations, the blended 130 ingredients may be allowed to sit prior to further processing, such as for about 1 hour.

In a separate vessel, a reaction mixture of liquid potassium hydroxide and liquid sodium dihydrogen phosphate may be allowed to react 140 to form the liquid sodium potassium phosphate emulsifying salt mixture, described above. In some implementations, the liquid potassium hydroxide may be held in a vessel separate from a vessel holding the liquid sodium dihydrogen phosphate, and the two may be combined in a third vessel, e.g., a reaction vessel, where the emulsifying salt reaction takes place. Alternatively, the vessel holding the liquid potassium hydroxide or the liquid sodium dihydrogen phosphate may serve as the reaction vessel. As discussed above, the emulsifying salt mixture may additionally include liquid sodium dihydrogen phosphate, sodium potassium hydrogen phosphate, sodium dipotassium phosphate, disodium potassium phosphate, disodium hydrogen phosphate, dipotassium hydrogen phosphate, trisodium phosphate, tripotassium phosphate alone or in combination. Further, the emulsifying salt mixture may include unreacted sodium dihydrogen phosphate or unreacted potassium dihydrogen phosphate.

The liquid emulsifying salt mixture may be transferred from the reaction vessel and added to a cooker (e.g., a twin ribbon cooker) along with the cheese mixture from the blender for cooking 150. In some implementations, the liquid emulsifying salt mixture may be added to the cooker after a portion of the cheese mixture is added to the cooker (e.g., after approximately 30 percent of the total amount of the cheese mixture to be provided to the cooker is added). In some implementations, the first portion of the cheese mixture may be heated to about 120° F. in the cooker prior to the liquid emulsifying salt mixture addition. In further implementations, the addition of the liquid emulsifying salt mixture may coincide with a steam injection process used to heat the contents of the cooker. The remaining amount of the cheese mixture may be added to the cooker and the process cheese composition may be heated for pasteurization and to produce a sol of the aqueous and fat components. During the blend or gel to sol transition, calcium in casein within the cheese mixture may be displaced by the potassium and sodium to form sodium and potassium caseinate, which increases the capacity of casein to facilitate the interaction between the fat and aqueous components in the molten cheese blend thus stabilizing the mixture. The resulting product may form a gel during the sol to gel transition upon cooling, forming a process cheese composition, wherein fat is emulsified in a hydrated protein matrix. The temperature to which the liquid emulsifying salt and cheese mixture are heated and heating times may vary, but in some implementations, the mixture may be subjected to cooking 160° F. up to about 185° F. for about 1 minute.

In addition or alternatively, the emulsifying salt mixture may be added to the blender during blending 130 of the cheese mixture. For example, all or a portion of the emulsifying salt mixture may be added to the cheese mixture within the blenders and may be blended 130 with the cheese, dairy powders, water and milkfats prior to cooking 150. In this example, the emulsifying salts may begin reacting with the casein.

The addition of the emulsifying salt mixture to the ingredient composition shortly after the reaction of the potassium hydroxide with the sodium dihydrogen phosphate takes place may add heat to the blending 130 and/or the cooking 150 processes due to the exothermic reaction of the emulsifying salt mixture, which causes the mixture to reach temperatures of about 175° F. For example, when added during blending 130 shortly after reacting (e.g., within about 2 minutes), this adds heat to the mixture. In addition, providing a liquid emulsifying salt mixture facilitates emulsification of the cheese mixture during blending 130 because the salts are in solubilized form within the liquid mixture, whereas the dry forms of emulsifying salts take time to dissolve and may not completely solubilize, at the temperatures characteristically used during the blending 130 process. Further, the liquid emulsifying salt mixture is pumpable and adds handling flexibility in blending 130 and cooking 150. For example, the pumpable mixture may be automatically added during batch or continuous processing of the food composition, whereas dry emulsifying salts are generally hand added, which increases the chance of over or under application.

The process cheese composition containing the noted molten sol may be packaged 160 using conventional packaging systems, for example, into loafs or tubs. The process cheese composition may then be cooled 170 using conventional cooling apparatuses in so that the packaged product retains its shape, e.g., from molding. Alternatively, the composition may be further processed into various forms such as powders, by for example, spray drying. As another alternative, the composition may be cooled in sheets on cooling belts in continuous processes and formed into stacks of ribbons for harping into various slice on slice product configurations.

The reduced sodium process cheese products produced according to method 100 may include a portion of potassium citrate and sodium citrate as emulsifying agents that serve to stabilize the fat in the process cheese due to the displacement of calcium in the casein in conjunction with the sodium and potassium from the sodium potassium phosphate emulsifying salt. This is in contrast to process cheese products containing only sodium phosphate-derived sodium caseinates that are formed by the reaction of the calcium with the sodium in sodium phosphate (e.g., sodium dihydrogen, disodium hydrogen and trisodium phosphate).

Certain aspects provided herein are more particularly described in the following Example, which is intended for illustration only, as numerous modifications and variations within the scope of the present disclosure will be apparent to those skilled in the art.

Example: Comparison of Less Sodium Emulsifying Salt Compositions in Process Cheese Materials and Methods Three less sodium process cheese formulations were studied to determine what impact a reaction of sodium dihydrogen phosphate (MSP ($NaH_2PO_4$)) with potassium hydroxide (KOH) has on processing and finished product characteristics in comparison to dipotassium phosphate combined with sodium phosphate emulsifying salt mixture.

It is believed that reaction of MSP and KOH would simplify production of reduced sodium process cheese and there would be no need for a separate dipotassium hydrogen phosphate ($K_2HPO_4$) stream to incorporate into the process.

The three formulations produced used: a control (e.g., dry dipotassium hydrogen phosphate ("DKP")); a liquid DKP (50% liquid dipotassium hydrogen phosphate); and a liquid KOH (liquid potassium hydroxide reacted with sodium dihydrogen phosphate ("MSP") to produce liquid sodium potassium hydrogen phosphate, so that the liquid phosphate system carries the entire phosphate load).

Table 1 below provides the emulsifying salt components used in the process cheese compositions tested.

TABLE 1

| Sample | Emulsifying Salt Components |
|---|---|
| Control | MSP (45% liq), NaOH (50% liq) and hand add Dipotassium Hydrogen Phosphate (dry) |
| Liquid DKP | MSP (45% liq), NaOH (50% liq) and Dipotassium Hydrogen Phosphate (liquid) |
| Liquid KOH | MSP (45% liq), KOH (50% liq) |

The sodium hydroxide ("NaOH") and MSP emulsifier components in the control sample were allowed to react prior to addition to the cooker, while the dry potassium hydrogen phosphate was added by hand to the cooker. The liquid DKP was formulated with the same total solids delivery as that delivered in dry dipotassium hydrogen phosphate formula control. In the liquid DKP sample, each of the liquid MSP, NaOH were subjected to a reaction and the liquid dipotassium hydrogen phosphate was added as a separate ingredient to the cooker. In the liquid KOH sample, the liquid MSP was reacted with the liquid KOH control to form liquid sodium potassium hydrogen phosphate (Na-$KHPO_4$) prior to addition to the cooker.

Each of the process cheese samples tested included compositions with cheddar cheese, anhydrous milkfat, dairy powder, water and sodium chloride. Other than the emulsifier compositions, the three process cheese compositions tested were substantially the same.

For sensory testing, 5 lb. loaf samples were sliced on a Hobart Slicer (model 2912) to produce a 19 g slice. Slices were cut in half on a cheese board, stacked, wrapped in plastic wrap, and transferred to the Delfield cooler. Samples were transferred from the plastic wrapped stacks to 6" white paper plates as needed. The samples were served at a temperature of about 48-52° F. under white lighting.

Results

Tables 2-4 below provide acceptance ratings from 66 subjects.

TABLE 2

| Formula | Overall | | |
|---|---|---|---|
| Dry DKP | 6.3 | | B |
| Liquid DKP | 6.2 | | B |
| Liquid KOH | 6.5 | A | |

TABLE 3

| Formula | Flavor | | |
|---|---|---|---|
| Dry DKP | 6.2 | | B |
| Liquid DKP | 6.2 | | B |
| Liquid KOH | 6.6 | A | |

TABLE 4

| Formula | Texture/Mouthfeel | |
|---|---|---|
| Dry DKP | 6.6 | A |
| Liquid DKP | 6.5 | A |
| Liquid KOH | 6.6 | A |

Where for Tables 2-4: 9=Like Extremely; 5=Neither Like nor Dislike; 1=Dislike Extremely. LS Means followed by different letters show statistical difference at 95% CI (Duncan's). The majority of appearance comments of Table 4 involved the number or size of air holes in the samples.

Tables 5-18 below provide descriptive analysis ratings from 14 trained panelists.

TABLE 5

| Formula | Sticky Mouthfeel[b] | – |
|---|---|---|
| Dry DKP | 13.1 | B |
| Liquid DKP | 13.2 | B |
| Liquid KOH | 14.5 | A |

[b]Taking a 2-layer bite and chewing a little to evaluate degree to which sample feels sticky, adhesive, clings to teeth, roof of mouth. (slight-very)

TABLE 6

| Formula | Cheese Aroma[c] | | |
|---|---|---|---|
| Dry DKP | 10.5 | A | B |
| Liquid DKP | 10.6 | A | |
| Liquid KOH | 9.8 | | B |

[c]Pick up the cheese, break it open, smell the cut edge and evaluate the intensity of cheese aroma including cheddar cheese aroma. (weak-strong)

TABLE 7

| Formula | Graininess Mouthfeel[d] | – |
|---|---|---|
| Dry DKP | 6.1 | A |
| Liquid DKP | 6.3 | A |
| Liquid KOH | 4.8 | B |

[d]Taking a 2-layer bite and chewing a little to evaluate degree to which sample feels grainy/coarse/not smooth in your mouth. (smooth-grainy)

TABLE 8

| Formula | Whey Aroma[e] | – | |
|---|---|---|---|
| Dry DKP | 8.0 | A | B |
| Liquid DKP | 8.4 | A | |
| Liquid KOH | 7.7 | | B |

[e]Pick up the cheese, break it open, smell the cut edge and evaluate the intensity of whey aroma. (weak-strong) Not Barny whey.

TABLE 9

| Formula | Moist Mouthfeel[f] | – | |
|---|---|---|---|
| Dry DKP | 19.6 | | B |
| Liquid DKP | 19.0 | | B |
| Liquid KOH | 21.2 | A | |

[f]During chewing, degree to which sample feels oily or moist, not dry. (slight-very)

TABLE 10

| Formula | Creamy Mouthfeel[h] | – | |
|---|---|---|---|
| Dry DKP | 18.7 | | B |
| Liquid DKP | 18.0 | | B |
| Liquid KOH | 21.3 | A | |

[h]During chewing for approximately 5 to 10 seconds degree to which sample has a creamy mouthfeel, a full-fat feel. (slight-very)

TABLE 11

| Formula | Salty Flavor[i] | + | |
|---|---|---|---|
| Dry DKP | 14.1 | | B |
| Liquid DKP | 14.2 | | B |
| Liquid KOH | 15.1 | A | |

[i]Intensity of salty taste. (weak-strong)

TABLE 12

| Formula | Breakdown Mouthfeel[j] | – | |
|---|---|---|---|
| Dry DKP | 17.8 | | B |
| Liquid DKP | 17.5 | | B |
| Liquid KOH | 19.0 | A | |

[j]During chewing for approximately 5 to 10 seconds, the degree to which samples breaks down in your mouth from lumpy chunks to little pieces to breaks down completely. (low-high)

TABLE 13

| Formula | Full Fat Flavor[k] | | |
|---|---|---|---|
| Dry DKP | 11.9 | A | B |
| Liquid DKP | 11.5 | | B |

TABLE 13-continued

| Formula | Full Fat Flavor[k] | | |
|---|---|---|---|
| Liquid KOH | 12.5 | A | |

[k]Intensity of full-fat flavor like that found in cream or coconut cream. (weak-strong)

TABLE 14

| Formula | Salty Aftertaste/ Afterfeel[l] | + | |
|---|---|---|---|
| Dry DKP | 12.7 | | B |
| Liquid DKP | 13.1 | | B |
| Liquid KOH | 13.7 | A | |

[l]Wait 5 seconds after swallowing and mouth is empty to evaluate the intensity of lingering salty taste remaining. (weak-strong)

TABLE 15

| Formula | Buttery Flavor[m] | + | |
|---|---|---|---|
| Dry DKP | 8.8 | | B |
| Liquid DKP | 8.7 | | B |
| Liquid KOH | 9.4 | A | |

[m]Intensity of buttery flavor like butter. (weak-strong)

TABLE 16

| Formula | Cheese Aftertaste/ Afterfeel[n] | + | |
|---|---|---|---|
| Dry DKP | 12.7 | | B |
| Liquid DKP | 12.6 | | B |
| Liquid KOH | 13.3 | A | |

[n]Intensity of lingering cheese flavor remaining. (weak-strong)

TABLE 17

| Formula | Dairy Sweet Flavor[o] | + | |
|---|---|---|---|
| Dry DKP | 10.6 | A | B |
| Liquid DKP | 9.9 | | B |
| Liquid KOH | 11.2 | A | |

[o]Intensity of dairy sweet flavor like the sweet flavor found in dairy products (milk, cream, cheese). (weak-strong)

TABLE 18

| Formula | Whey Aftertaste/ Afterfeel[p] | – | |
|---|---|---|---|
| Dry DKP | 10.1 | A | B |
| Liquid DKP | 10.6 | A | |

TABLE 18-continued

| Formula | Whey Aftertaste/ Afterfeel[P] | – |
|---|---|---|
| Liquid KOH | 9.8 | B |

[P]Wait 5 seconds after swallowing and mouth is empty to evaluate the intensity of sweet whey flavor remaining. (weak-strong) Not Barny Whey.

In tables 5-18, the numerical rankings were from low to high, slight to very and weak to strong, in which a low number represents the first descriptor and a higher number represents the second descriptor based on a 60 point scale. LS Means followed by different letters show statistical difference at 95% CI (Duncan's). In these tables, a "+" sign indicates positive driver of liking, and a "−" sign indicates negative driver of liking based on the more critical consumer segment from the 2007 White Deli American Drivers of Liking (#3980).

Results Summary

Results from the 66 testers, as shown in tables 2-4, show significant differences between products in all measures of liking and significant differences were seen between formulas in overall, flavor, and appearance liking. The liquid KOH formula prepared using an emulsifying salt mixture of sodium potassium hydrogen phosphate was the best-liked formula (overall and flavor).

From the trained panelists, the formulas affected multiple significant sensory attributes as reflected in Tables 5-18 above. The liquid KOH formula had a significantly creamier mouthfeel compared to the control and the liquid DKP samples (Table 10), and was moderately moister in mouthfeel compared to the control and the liquid DKP (Table 9). Small sensory differences were observed in the cheese and whey aroma; the salty, full fat, buttery and dairy sweet flavors; the sticky, grainy and breakdown mouthfeel; and the salty, cheese and whey aftertaste.

Compared to the control, the liquid KOH samples had increased positive drivers of liking including buttery and salty flavor and salty and cheese aftertaste. In contrast, compared to the control, the liquid DKP had no statistically significant differences in any of the positive drivers of liking. Compared to the control, the liquid KOH samples had a decrease in negative drivers of liking in graininess (Table 7) and approximately the same whey aroma and whey aftertaste. In contrast, compared to the control, the liquid DKP had no statistically significant differences in the negative drivers of liking with respect to graininess.

Figure 2:
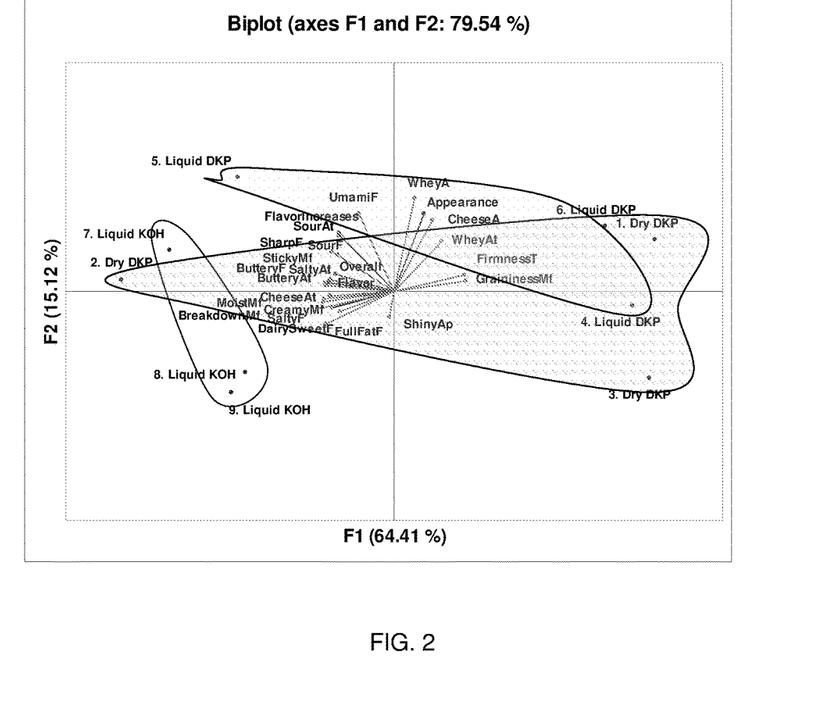
FIG. 2 illustrates a multivariate analysis of the Example in which control, liquid dipotassium phosphate and liquid potassium hydroxide samples were analyzed using a principal component analysis (PCA) bi-plot of significantly different quantitative descriptive analysis (QDA) attributes.

FIG. 2 illustrates a multivariate analysis of the control, liquid DKP and liquid KOH samples using a principal component analysis ("PCA") bi-plot of significantly different quantitative descriptive analysis ("QDA") attributes. This multivariate analysis shows groupings or clusters of the three samples based on the quantitative measurements of Tables 5-18. By applying PCA to descriptive analysis data, the set of dependent variables (i.e., attributes) is reduced to a smaller set of underlying variables (called factors) based on patterns of correlation among the original variables. See Sensory Evaluation of Dairy Products, Innovations In Dairy (October 2005), which is incorporated by reference for any useful purpose.

According to FIG. 2, both sets of liquid formula (liquid DKP and liquid KOH) appear to have less variability in sensory attributes than the dry DKP (control) formula. The liquid KOH formula appears to have less variability than the liquid DKP formula. The liquid KOH formula appears to be more closely correlated with the positive sensory attributes of buttery, dairy sweet, and salty than the liquid DKP and dry DKP (control) formulas.

In addition, the liquid KOH product was preferred to the liquid DKP utilizing a 50% potassium phosphate liquid source and over the control dry DKP version of potassium phosphate referenced. This would indicate that the liquid KOH product is preferred over a potassium phosphate ingredient, whether in dry or liquid-based form.

Although the present disclosure provides references to specific embodiments, persons skilled in the art will recognize that changes may be made in form and detail without departing from the spirit and scope of the invention.

What is claimed is:

1. A method of preparing a dairy product comprising:
   combining a dairy ingredient with an emulsifying salt mixture of one or more of liquid sodium potassium hydrogen phosphate or liquid sodium dipotassium phosphate to form the dairy product,
   wherein the liquid sodium potassium hydrogen phosphate, the liquid sodium dipotassium phosphate or a combination thereof accounts for at least 50 percent of the emulsifying salt mixture, and
   wherein any sodium hydroxide in the emulsifying salt mixture is less than 0.05 percent by weight of the emulsifying salt mixture.

2. The method of claim 1, further comprising, prior to the step of combining, reacting, in solution, one or more of potassium hydroxide with sodium dihydrogen phosphate or sodium hydroxide with potassium dihydrogen phosphate to form the emulsifying salt mixture.

3. The method of claim 2, wherein the potassium hydroxide or the sodium hydroxide, prior to reacting in the emulsifying salt mixture, accounts for at least about 0.5 and up to about 4 percent by weight of the total weight of the dairy product.

4. The method of claim 2, wherein the sodium dihydrogen phosphate or the potassium dihydrogen phosphate, prior to reacting in the emulsifying salt mixture, accounts for at least about 2 and up to about 6.67 percent by weight of the total weight of the dairy product.

5. The method of claim 1, wherein the emulsifying salt mixture accounts for at least about 2.5 and up to about 8.32 percent by weight of a total weight of the dairy product.

6. The method of claim 1, wherein the dairy ingredient comprises cheese, the method further comprising:
   heating the combination of the cheese and the emulsifying mixture to form a process cheese product.

7. The method of claim 1, wherein the emulsifying salt mixture exhibits a reduced level of crystallization compared to a disodium phosphate-based emulsifying salt mixture that is substantially free of potassium.

8. A method of preparing a dairy product comprising:
   combining a dairy ingredient with an emulsifying salt mixture of one or more of liquid sodium potassium hydrogen phosphate or liquid sodium dipotassium phosphate to form the dairy product,
   wherein at least one of sodium potassium hydrogen phosphate or sodium dipotassium phosphate accounts for at least 50 percent of the emulsifying salt mixture, and
   wherein the emulsifying salt mixture, prior to reaction, accounts for at least about 2.5 and up to about 8.32 percent by weight of a total weight of the dairy product.

9. The method of claim 8, further comprising, prior to the step of combining, reacting, in solution, one or more of potassium hydroxide with sodium dihydrogen phosphate or sodium hydroxide with potassium dihydrogen phosphate to form the emulsifying salt mixture.

10. The method of claim 9, wherein the potassium hydroxide or the sodium hydroxide, prior to reacting in the emulsifying salt mixture, accounts for at least about 0.5 and up to about 4 percent by weight of the total weight of the dairy product.

11. The method of claim 9, wherein the sodium dihydrogen phosphate or the potassium dihydrogen phosphate, prior to reacting in the emulsifying salt mixture, accounts for at least about 2 and up to about 6.67 percent by weight of the total weight of the dairy product.

12. The method of claim 8, wherein the dairy ingredient comprises cheese, the method further comprising:
heating the combination of the cheese and the emulsifying mixture to form a process cheese product.

13. A method of forming an emulsifying salt mixture comprising:
reacting, in solution, one or more of potassium hydroxide with sodium dihydrogen phosphate or sodium hydroxide with potassium dihydrogen phosphate to form an emulsifying salt mixture of one or more of liquid sodium potassium hydrogen phosphate or liquid sodium dipotassium phosphate,
wherein the liquid sodium potassium hydrogen phosphate, the liquid sodium dipotassium phosphate or a combination thereof accounts for at least 50 percent of the emulsifying salt mixture, and
wherein any sodium hydroxide in the emulsifying salt mixture is less than 0.05 percent by weight of the emulsifying salt mixture.

14. The method of claim 13, wherein the potassium hydroxide or the sodium hydroxide, prior to reacting in the emulsifying salt mixture, accounts for about 10 to about 55 percent of the emulsifying salt mixture.

15. The method of claim 13, wherein the sodium dihydrogen phosphate or the potassium dihydrogen phosphate, prior to reacting in the emulsifying salt mixture, accounts for about 20 to about 55 percent of the emulsifying salt mixture.

* * * * *